Patented July 22, 1941

2,249,768

UNITED STATES PATENT OFFICE 2,249,768

PREPARATION OF ALLYL ESTERS

Edward L. Kropa, Stamford, Conn., assignor to American Cyanamid Company, New York, N. Y., a corporation of Maine No Drawing. Application June 30, 1939, Serial No. 282,194

10 Claims. (Cl. 260—475)

This invention relates to the preparation of esters of allyl alcohol.

Prior attempts to produce esters of allyl alcohol by direct esterification of the alcohol with an acid or an anhydride have frequently resulted in failure because of the tendency of the reaction mixture to gel. Accordingly, the usual procedure has been to prepare an acid chloride and then form the ester therefrom. Such a process is not only expensive but not feasible for commercial production.

An object of this invention is to provide a process for producing allyl alcohol esters which is economical and commercially practicable. More specifically, an object of this invention is to esterify allyl alcohol with acids or anhydrides directly without resorting to the use of acid chlorides. Still another object of this invention is to provide a method of esterifying allyl alcohol and an unsaturated acid whereby the tendency to gel is eliminated.

These and other objects are attained by esterifying the allyl alcohol with an acid in the presence of an organic sulfonic acid esterification catalyst and in the presence of a polymerization inhibitor. The reaction is carried out preferably under azeotropic conditions utilizing an inert solvent which is preferably insoluble in water. The reactants are placed in a suitable reaction vessel which is desirably provided with suitable refluxing condenser equipment and suitable means for separating the water formed during the reaction from the reflux condensate. It is usually desirable that some means of agitation be provided. The following examples are given by way of illustration and not in limitation.

Example 1

| | Parts by weight |
|---|---|
| Maleic anhydride | 98 |
| Allyl alcohol | 170 |
| Ethylene dichloride | 200 |
| d-Camphor sulfonic acid | 4 |
| Bronze powder | 4 |

This mixture is heated at about 120° C. azeotropically for about eleven hours in an apparatus provided with means for separating the water formed during the reaction. The ethylene dichloride and the low boiling fractions of the resulting product are removed under vacuum. The liquid fraction boiling at about 91°–92° C. at a pressure of about 1–2 mm. of mercury is the final product and is water white. About 80–90% yields are readily obtained. The product so obtained is stable without inhibitors at room temperature for long periods of time provided the product is free of acid or half ester since the presence of acidic constituents causes diallyl maleate to slowly thicken.

Example 2

| | Parts by weight |
|---|---|
| Fumaric acid | 116 |
| Allyl alcohol | 130 |
| Ethylene dichloride | 200 |
| p-Toluene sulfonic acid | 1 |
| Bronze powder | 0.2–0.5 |

This mixture is reacted in the same general manner as described in Example 1 and a clear water-white ester is obtained which boils at about 93° C. at a pressure of about 3 mm. of mercury. The odor is quite different from that of the diallyl maleate prepared according to Example 1.

Example 3

| | Parts by weight |
|---|---|
| Succinic anhydride | 200 |
| Allyl alcohol | 260 |
| Toluene | 200 |
| p-Toluene sulfonic acid | 5 |
| Copper-bronze powder | 0.5 |

This composition is heated and distilled in the same general manner as in Example 1, thereby obtaining an ester having a boiling point of 95° C. at a pressure of about 1.5–2.0 mm. of mercury.

Example 4

| | Parts by weight |
|---|---|
| Sebacic acid | 158 |
| Allyl alcohol | 116 |
| Toluene | 200 |
| p-Toluene sulfonic acid | 1 |
| Copper-bronze powder | 0.5 |

The above composition is reacted in the same general way as in Example 1 and distilled. The product is a clear water-white ester boiling at 165°–175° C. at a pressure of about 1 mm. of mercury.

Example 5

| | Parts by weight |
|---|---|
| Tricarballylic acid | 156 |
| Allyl alcohol | 175 |
| Toluene | 150 |
| p-Toluene sulfonic acid | 1 |
| Copper-bronze powder | 0.5 |

This mixture is treated in the same general manner as in Example 1 except that a somewhat longer period of heating is employed, e. g. twelve to sixteen hours. The volatile ester is removed from the small amount of non-volatile matter, yielding a product boiling at about 150–162° C. at a pressure of about 1–2 mm. of mercury.

Example 6

| | Parts by weight |
|---|---|
| Eleostearic acids | 189 |
| Allyl alcohol | 50 |
| Benzene | 200 |
| p-Toluene sulfonic acid | 1 |
| Copper-bronze powder | 0.5 |

This composition is reacted in the same general manner as in Example 1 except that the heating period is about fourteen hours. The volatile products distill at about 171–180° C. at a pressure of about 1 mm. mercury.

Example 7

| | Parts by weight |
|---|---|
| Phthalic anhydride | 500 |
| Allyl alcohol | 450 |
| Toluene | 300 |
| p-Toluene sulfonic acid | 5 |
| Copper bronze powder | 0.5 |

This mixture is agitated and heated azeotropically for about thirty hours. The low boiling solvents are removed together with any excess alcohol under vacuum and the residue distilled. The diester obtained has a boiling point of about 140–150° C. at 1–2 mm. pressure. It is a clear water-white liquid possessing a slight blue fluorescence. The reaction may be carried out somewhat faster if a good fractionating column be placed between the still and the condenser.

Other acids or anhydrides may be esterified with allyl alcohol in the same general manner as illustrated in the examples set forth above. The process is particularly suitable for producing esters of polycarboxylic acids or anhydrides. It is even more suitable for the formation of esters of unsaturated organic acids and especially those acids which contain an alpha, beta-unsaturation. Ordinarily esters derived from unsaturated acids tend to polymerize quite rapidly and, therefore, if ordinary methods of esterification are employed, the reaction mixture will frequently gel. On the other hand, if my method of esterification is used, the tendency to gel is substantially reduced. Among the inorganic acids which may be esterified in the same general manner are: phosphoric acid, boric acid, etc.

For convenience the term "acid" as used herein is intended to include the anhydride as well as the acid since either the acid or anhydride may be used according to convenience and availability.

The esterification of the allyl alcohol is preferably conducted under azeotropic conditions in order to facilitate the removal and separation of the water formed during the condensation of the alcohol and acid. Accordingly I use an organic distilling medium which is relatively insoluble in water but which possesses the property of forming with water vapors volatile vapor mixtures. These vapor mixtures, upon condensation, separate into an essentially aqueous fraction and an essentially non-aqueous fraction. Examples of these media are: benzene, toluene, xylene, chloroform, carbon tetrachloride, ethylene dichloride, propylene dichloride, ethylene and propylene trichloride, butylene dichloride and trichloride, cresol, methyl cyclohexanone, etc. Suitable distillation temperatures range between about 80° C. and about 145° C., for example, for the lower boiling members of the group of materials set forth above. Obviously this will vary with different substances and with different concentrations of the substances. The range of preferred concentrations of the organic medium in the reaction mixture is from about 25% to about 50%.

During the course of the reaction the vapors from the reaction chamber are condensed and the condensate is passed to a trap in which the condensate may separate into two layers. The lower layer is essentially water with minor amounts of allyl alcohol and the organic distilling medium. The upper layer which is returned to the reaction mixture is essentially allyl alcohol and the distilling medium together with only a negligible amount of water. The use of the organic distilling medium and operation under azeotropic conditions is particularly advantageous in the production of allyl esters of unsaturated organic acids inasmuch as the distilling medium dilutes the reaction mixture sufficiently that the tendency to gel is substantially reduced during the necessary heating period.

Suitable esterification catalysts are the organic sulfonic acids, e. g. p-toluene sulfonic acid, d-camphor sulfonic acid, thymol sulfonic acid, etc. About 0.5–3% of catalyst based on the weight of alcohol used is generally sufficient. The organic sulfonic acid esterification catalysts are particularly suitable since they do not tend to gel the reactants or reaction products. This tendency to gel the reactants or reaction products is one of the disadvantages of many esterification catalysts in this process. Furthermore, the organic sulfonic acid esterification catalysts may be removed from the final product merely by distillation without resorting to the undesirable washing operation which is necessary if many other catalytic materials be used. The organic sulfonic acid esterification catalysts are also particularly suitable for the reaction of allyl alcohols with acids because good yields of the allyl ester are generally obtained and only very low yields of undesirable products of side reactions are formed.

Copper bronze powder has been found to be particularly suitable as a polymerization inhibitor. Any other suitable inhibitor may be used including sulfur, p-phenylene diamine, hydroquinone, tannic acid and various amino and sulfur compounds. If compounds such as hydroquinone be used, it is desirable to remove them from the product by washing the latter with dilute alkali solution. Copper powder, copper salts of the acids being esterified or a copper vessel may also be used. The metallic powders have the advantage that they will remain as a residue when the ester is distilled off from the reaction mixture. About one tenth to about two parts by weight of inhibitor per one hundred parts by weight of alcohol are usually suitable.

The esters made according to this invention have a wide variety of uses as solvents, or as polymerizable ingredients in coating compositions, in resin castings and in resin molding compositions. Some of these esters may be used in adhesive compositions and some may be polymerized for various purposes. Many of the allyl esters are good softeners and plasticizers for synthetic and natural resins as well as ester gum, nitrocellulose or cellulose esters. They are particularly valuable for such purposes because they tend to polymerize and, therefore, they are not lost by volatilization which is the disadvantage of many of the ordinary plasticizers.

Obviously many modifications may be made in the process described above without departing from the spirit and scope of the invention as defined in the appended claims.

I claim:

1. A process of producing allyl esters which comprises heating to reaction temperature allyl alcohol with a polycarboxylic acid in the presence of an organic sulfonic acid esterification catalyst and a polymerization inhibitor selected from the group consisting of copper and its alloys.

2. A process of producing allyl esters which comprises heating to reaction temperature a reaction mixture containing allyl alcohol, a polycarboxylic acid, an organic sulfonic acid esterification catalyst, a polymerization inhibitor selected from the group consisting of copper and its alloys and an organic distilling medium which is relatively insoluble in water but which possesses the property of forming with water vapors volatile vapor mixtures which upon condensation separate into an essentially aqueous fraction and an essentially non-aqueous fraction, continuing said heating at such a temperature that a vapor mixture containing the organic distilling medium and water of condensation is formed, condensing the vapor so formed, separating the condensed vapors into an essentially aqueous fraction and an essentially non-aqueous fraction, returning the essentially non-aqueous fraction to the reaction mixture and distilling off the allyl ester thus produced, thereby leaving as a residue the esterification catalyst and the polymerization inhibitor.

3. A process of producing allyl esters which comprises heating to reaction temperature allyl alcohol with a polycarboxylic acid in the presence of an organic sulfonic acid esterification catalyst and a polymerization inhibitor selected from the group consisting of copper and its alloys.

4. A process of producing allyl esters which comprises heating to reaction temperature allyl alcohol with an alpha, beta-unsaturated polycarboxylic acid in the presence of an organic sulfonic acid esterification catalyst and a polymerization inhibitor selected from the group consisting of copper and its alloys.

5. A process of producing allyl esters which comprises heating to reaction temperature allyl alcohol with a polycarboxylic acid in the presence of p-toluene sulfonic acid and copper bronze powder.

6. A process as in claim 2 wherein the esterification catalyst is p-toluene sulfonic acid and the polymerization inhibitor is copper bronze powder.

7. A process of producing allyl esters which comprises heating to reaction temperature allyl alcohol with a substance selected from the group consisting of maleic acid and maleic anhydride in the presence of an organic sulfonic acid esterification catalyst and a polymerization inhibitor selected from the group consisting of copper and its alloys.

8. A process of producing allyl esters which comprises heating to reaction temperature allyl alcohol with fumaric acid in the presence of an organic sulfonic acid esterification catalyst and a polymerization inhibitor selected from the group consisting of copper and its alloys.

9. A process of producing allyl esters which comprises heating to reaction temperature allyl alcohol and a substance selected from the group consisting of phthalic acid and phthalic anhydride in the presence of an organic sulfonic acid esterification catalyst and a polymerization inhibitor selected from the group consisting of copper and its alloys.

10. A process of producing allyl esters which comprises heating to reaction temperature a reaction mixture containing allyl alcohol, a substance selected from the group consisting of maleic acid and maleic anhydride, an organic sulfonic acid esterification catalyst, a polymerization inhibitor selected from the group consisting of copper and its alloys and an organic distilling medium which is relatively insoluble in water but which possesses the property of forming with water vapors volatile vapor mixtures which upon condensation separate into an essentially aqueous fraction and an essentially non-aqueous fraction, continuing said heating at such a temperature that a vapor mixture containing the organic distilling medium and water of condensation is formed, condensing the vapor so formed, separating the condensed vapors into an essentially aqueous fraction and an essentially non-aqueous fraction, returning the essentially non-aqueous fraction to the reaction mixture and distilling off the diallyl maleate thus produced, thereby leaving as a residue the esterification catalyst and the polymerization inhibitor.

EDWARD L. KROPA.